(12) United States Patent  
Yu

(10) Patent No.: US 9,179,275 B2  
(45) Date of Patent: Nov. 3, 2015

(54) METHOD AND APPARATUS FOR RECEIVING OR SENDING SHORT MESSAGE

(71) Applicant: Huawei Technologies Co., LTD, Shenzhen (CN)

(72) Inventor: Yijun Yu, Shanghai (CN)

(73) Assignee: Huawei Technologies Co. LTD., Shenzhen (CN)

( * ) Notice: Subject to any disclaimer, the term of this patent is extended or adjusted under 35 U.S.C. 154(b) by 97 days.

(21) Appl. No.: 14/065,523

(22) Filed: Oct. 29, 2013

(65) Prior Publication Data

US 2014/0051466 A1   Feb. 20, 2014

Related U.S. Application Data

(63) Continuation of application No. PCT/CN2011/073614, filed on May 3, 2011.

(51) Int. Cl.
| | |
|---|---|
| H04W 4/00 | (2009.01) |
| H04W 24/00 | (2009.01) |
| H04W 4/14 | (2009.01) |
| H04W 60/04 | (2009.01) |
| H04W 8/06 | (2009.01) |
| H04W 68/00 | (2009.01) |

(52) U.S. Cl.
CPC ........... *H04W 4/14* (2013.01); *H04W 8/06* (2013.01); *H04W 60/04* (2013.01); *H04W 68/005* (2013.01)

(58) Field of Classification Search
None
See application file for complete search history.

(56) References Cited

U.S. PATENT DOCUMENTS

| 2004/0048629 | A1 | 3/2004 | Yoon |
| 2010/0265884 | A1 | 10/2010 | Vikberg et al. |
| 2011/0117931 | A1* | 5/2011 | Hu et al. .................... 455/456.1 |
| 2011/0269457 | A1* | 11/2011 | Liu et al. ....................... 455/433 |

FOREIGN PATENT DOCUMENTS

| CN | 101657025 A | 2/2010 |
| CN | 101778348 A | 7/2010 |
| CN | 101933390 A | 12/2010 |
| CN | 102217338 B | 12/2013 |
| EP | 2299764 A1 | 3/2011 |
| EP | 2448299 A1 | 4/2011 |
| JP | 2008109653 A | 5/2008 |
| JP | 2011071983 A | 4/2011 |
| JP | 2012516580 A | 7/2012 |
| JP | 2012522469 A | 9/2012 |
| WO | 2009015273 A2 | 1/2009 |
| WO | 2010051763 A1 | 5/2010 |

(Continued)

OTHER PUBLICATIONS

Huawei, et al., "Paging accept in SGs NULL state at MME," 3GPP TSG-CT WG1 Meeting #70, C1-111442, Salt Lake City, Utah, Feb. 21-25, 2011, 4 pages.

(Continued)

*Primary Examiner* — Erika A Washington
(74) *Attorney, Agent, or Firm* — Slater & Matsil, L.L.P.

(57) ABSTRACT

A first message is sent by an MSC/VLR and it is determined that a user equipment is in an abnormal state according to the first message. A second message is sent to the user equipment. The second message is used to instruct the user equipment to initiate attachment to the MSC/VLR. An apparatus includes a receiving module, a first determining module and a sending module.

13 Claims, 7 Drawing Sheets

(56) References Cited

FOREIGN PATENT DOCUMENTS

| WO | 2010055012 A2 | 5/2010 |
|---|---|---|
| WO | 2010087350 A1 | 8/2010 |
| WO | 2010117761 A1 | 10/2010 |
| WO | 2011012305 A1 | 2/2011 |
| WO | 2011136248 A1 | 11/2011 |

OTHER PUBLICATIONS

NTT DOCOMO, "Discussion on IMS voice call termination when EPC node restarted," 3GPP TSG CT4 Meeting #49bis, C4-101732, Dublin, Ireland, Jun. 29-Jul. 2, 2010, 10 pages.

CISCO, "Reestablishment of UE's context after MME/S4-SGSN node failure," 3GPP TSG CT4 Meeting #50, C4-102054, Xi'an, P.R. China, Aug. 23-27, 2010, 8 pages.

Huawei, et al., "Discussion about the problems for SMS over SGs handling," SA WG2 Meeting #85, S2-112528, May 16-20, 2011, XiAn, P.R. China, 4 pages.

Huawei, et al., "Correction for SMS over SGs Problems," 3GPP TSG SA WG2 Meeting #85, S2-112530, May 16-20, 2011, Xi'An, P.R. China, 10 pages.

Vodafone, "Periodic Updates in Connected State," 3GPP TSG RAN WG2 #64, R2-086960, Prague, Czech Republic, Nov. 10-14, 2008, 5 pages.

Huawei, "Iu-CS based CS fallback architecture," 3GPP TSG SA WG2 Meeting #63, TD S2-081079, Athens, Greece, Feb. 18-22, 2008, 16 pages.

Vodafone, et al., "SMS over LTE SGs interface optimisations—SMS IWF," 3GPP TSG SA WG2 Meeting #75, TD S2-095320, Aug. 31-Sep. 4, 2009, Kyoto, Japan, 6 pages.

3rd Generation Partnership Project; Technical Specification Group Services and System Aspects; Circuit Switched (CS) fallback in Evolved Packet System (EPS); Stage 2 (Release 10), 3GPP TS 23.272 V10.3.0, Mar. 2011, 18 pages.

3rd Generation Partnership Project; Technical Specification Group Core Network and Terminals; Non-Access-Stratum (NAS) protocol for Evolved Packet System (EPS); Stage 3 (Release 10) 3GPP TS 24.301 V10.1.0, Dec. 2010, 41 pages.

3rd Generation Partnership Project; Technical Specification Group Core Network and Terminals; Mobility Management Entity (MME)—Visitor Location Register (VLR) SGs interface specification (Release 10), 3GPP TS 29.118 V10.2.0, Dec. 2010, 21 pages.

3rd Generation Partnership Project; Technical Specification Group Core Network and Terminals; Mobility Management Entity (MME)—Visitor Location Register (VLR) SGs interface specification (Release 10), 3GPP TS 29.118 V 10.3.0, Mar. 2011, 60 pages.

International Search Report for Application No. PCT/CN2011/073614, mailed Feb. 9, 2012, 11 pages.

3rd Generation Partnership Project; Technical Specification Group Services and System Aspects; Circuit Switched (CS) fallback in Evolved Packet System (EPS); Stage 2 (Release 10); 3GPP TS 23.272 V 10.3.1, Apr. 2011, 78 pages.

* cited by examiner

METHOD AND APPARATUS FOR RECEIVING OR SENDING SHORT MESSAGE

This application is a continuation of International Application No. PCT/CN2011/073614, filed on May 3, 2011, which is hereby incorporated by reference in its entirety.

TECHNICAL FIELD

The present invention relates to the field of communications and, in particular embodiments, to a method and apparatus for receiving or sending a short message.

BACKGROUND

An evolved packet system (EPS) includes an evolved universal mobile telecommunication system territorial access network (E-UTRAN) and an evolved packet core network (EPC). In order to support a circuit switched (CS) service, for example, a CS voice and a CS short message (SMS), in the EPS, an SGs interface is deployed between a mobility management entity (MME) of the EPS and a mobile switch center/visitor location register (MSC/VLR) of a circuit switched network to enable a user equipment (UE) to originate and receive the CS service at the EPS network, and return to a circuit domain (for example, a 2G/3G network) via an E-UTRAN, so as to complete the CS service, where the network architecture and the processing method may be referred to as "CS Fallback" (CSFB).

In the CSFB, the processing way of the short message service differs from those of other CS services (for example, the voice and the CS supplementary service). That is, the short message service does not need to fall back into the 2G/3G network. Short message delivery between the UE and the MSC/VLR is directly completed via the MME in the EPS network. Therefore, it is generally referred to as an "SMS over SGs" technology. In the prior art, the SMS over SGs processing process originated by the user (Mobile Originating SMS (MO SMS)) can achieve sending of a short message, and the SMS over SGs processing process received by the user (Mobile Terminated SMS (MT SMS)) can achieve receiving of a short message.

In the MO SMS process, when the user equipment is in an abnormal state, for example, the context of the user equipment in the MSC/VLR is lost, or the MSC/VLR cannot process the short message of the user, due to reasons such as a failure of the MSC/VLR (for example, the board reset), or the MSC/VLR recovering from a fault. At this time, the MSC/VLR indicates the MME that the current process fails, so the MME marks in the context of the UE in the MME, and indicates the UE to re-originate the registration to the MSC/VLR when the UE subsequently originates the tracking area update process. While it is not determined when the UE can originate the tracking area update process, and generally, at least several hours are needed, in this time period, the user cannot send the short message, that is, the sending of the short message cannot be achieved.

In the MT SMS process, when the user equipment is in an abnormal state, for example, the context of the user equipment in the MSC/VLR is lost, due to reasons such as a failure of the MSC/VLR (for example, the board reset), or the MSC/VLR recovering from the fault. At this time, the MSC/VLR can still receive a short message sent by an SMS-gateway mobile switching center (SMS-GMSC), and further send a paging message to the MME, and the MME further sends a service request message to the MSC/VLR, so as to indicate the MSC/VLR to start sending the short message. However, the user equipment context of the UE in the MSC/VLR is lost, so the MSC/VLR ignores the service request message sent by the MME, and cannot send the short message to the UE, that is, the receiving of a short message cannot be achieved. However, the MSC/VLR ignores the paging response sent by the MME, that is, the service request message, so the MSC/VLR considers that this paging fails, and pages repeatedly, resulting in a waste of network resources.

SUMMARY OF THE INVENTION

Accordingly, embodiments of the present invention provide a method and an apparatus for receiving or sending a short message, which can achieve receiving or sending of a short message service when a user equipment is in an abnormal state due to a failure of an MSC/VLR.

According to an aspect, an embodiment of the present invention provides a method for receiving or sending a short message. The method includes receiving a first message sent by a mobile switch center MSC/visitor location register VLR. It is determined that a user equipment is in an abnormal state according to the first message. A second message is sent to the user equipment. The second message is used to instruct the user equipment to initiate attachment to the MSC/VLR.

According to another aspect, an embodiment of the present invention provides an apparatus for receiving or sending a short message. The apparatus include a receiving module, which is configured to receive a first message sent by a mobile switch center MSC/visitor location register VLR. A first determining module is configured to determine that a user equipment is in an abnormal state according to the first message. A sending module is configured to send a second message to the user equipment. The second message is used to instruct the user equipment to initiate attachment to the MSC/VLR.

According to another aspect, an embodiment of the present invention provides an apparatus for receiving or sending a short message. A receiving module is configured to receive a second message sent by a mobile management device. The second message is used to instruct the apparatus to initiate attachment to a mobile switch center MSC/visitor location register VLR. A first sending module is configured to send a third message to the mobile management device according to the second message, so as to initiate attachment to the MSC/VLR.

Based on the technical solutions described above, according to the method and apparatus for receiving or sending a short message provided by the embodiments of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improve the user experience.

BRIEF DESCRIPTION OF THE DRAWINGS

To illustrate the technical solutions according to the embodiments of the present invention more clearly, the following introduces the accompanying drawings for describing the embodiments. Apparently, the accompanying drawings in the following description are only some embodiments of the present invention, and a person skilled in the art can derive other drawings from the accompanying drawings without creative efforts.

DETAILED DESCRIPTION OF ILLUSTRATIVE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by a person skilled in the art based on the embodiments of the present invention without creative efforts shall fall within the protection scope of the present invention.

Figure 1:
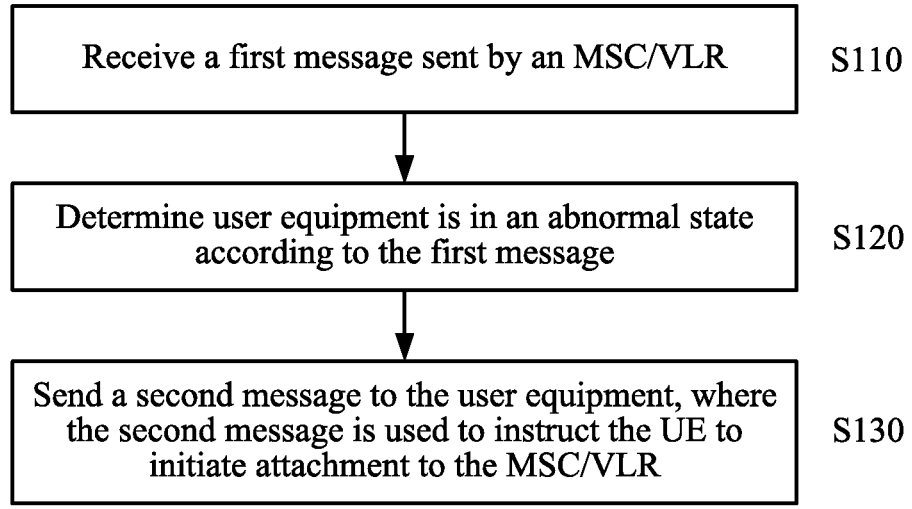
FIG. 1 is a schematic flow chart of a method for receiving or sending a short message according to an embodiment of the present invention.

FIG. 1 shows a schematic process chart of a method 100 for receiving or sending a short message according to an embodiment of the present invention. As shown in FIG. 1, the method 100 includes the following steps.

S110: Receive a first message sent by an MSC/VLR.

S120: Determine that a user equipment is in an abnormal state according to the first message.

S130: Send a second message to the user equipment, where the second message is used to instruct the user equipment to initiate attachment to the MSC/VLR.

When the user equipment is in an abnormal state, for example, the context of the user equipment in the MSC/VLR is lost, or the MSC/VLR cannot process the short message of the user, due to reasons such as a failure of the MSC/VLR (for example, a board reset), or the recovery of the MSC/VLR from the failure. At this time, the MSC/VLR indicates a mobile management device that the current process fails.

Therefore, when the mobile management device receives the first message sent by the MSC/VLR, and determines that the user equipment is in an abnormal state according to the first message, the mobile management device sends a second message to the user equipment, where the second message is used to instruct the user equipment to initiate attachment to the MSC/VLR, so that the user equipment can receive or send a short message normally.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

It should be understood that in the embodiment of the present invention, the user equipment being in an abnormal state includes the board reset, the user context losing and other situations that affect receiving or sending a short message normally. For example, the MSC/VLR may detect that the MSC/VLR does not have the context of the UE, or does not have a valid context of the UE (for example, the context is not confirmed by a wireless network, that is, a "Confirmed by Radio Contact" mark in the context of the UE in the MSC/VLR is set to be False; or not confirmed by a home location register (Home Location Register, "HLR" for short)), or no SGs connection of the UE exists. In the embodiment of the present invention, the situation that the MSC/VLR does not have the context of the UE, or the MSC/VLR does not have the valid context of the UE, or no SGs connection of the UE exists is taken as an example to illustrate that the user equipment is in an abnormal state, but the embodiments of the present invention are not limited thereto. It should further be understood that, in the embodiment of the present invention, the mobile management device may include a mobility management entity MME.

In the embodiments of the present invention, the method according to the embodiments of the present invention may include a method for receiving a short message and a method for sending a short message, which are described in the following.

Figure 2:
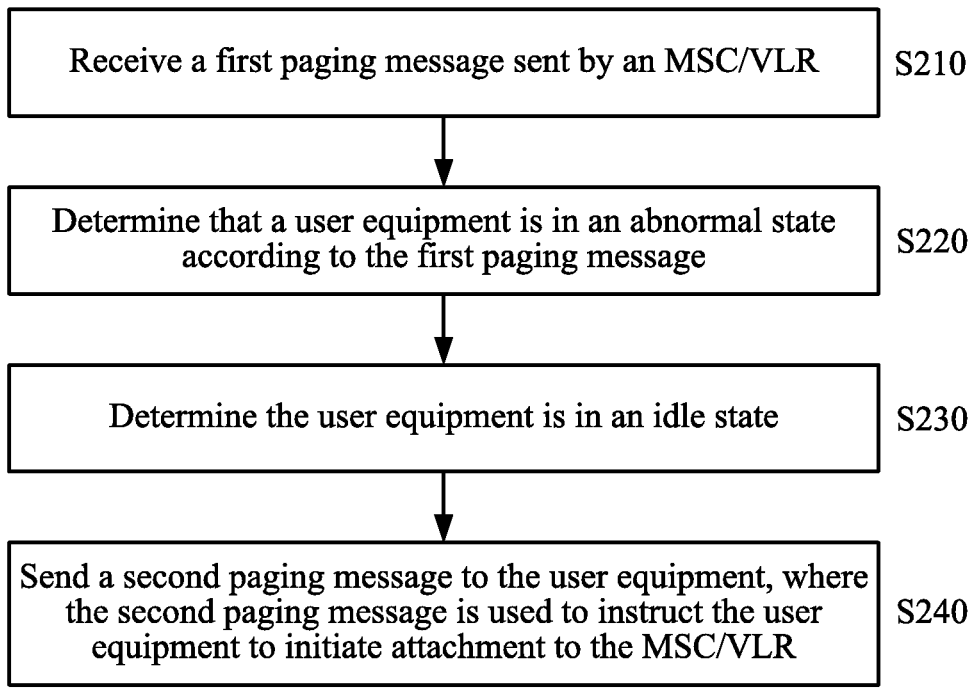
FIG. 2 is a schematic flow chart of a method for receiving a short message according to an embodiment of the present invention.
Figure 3:
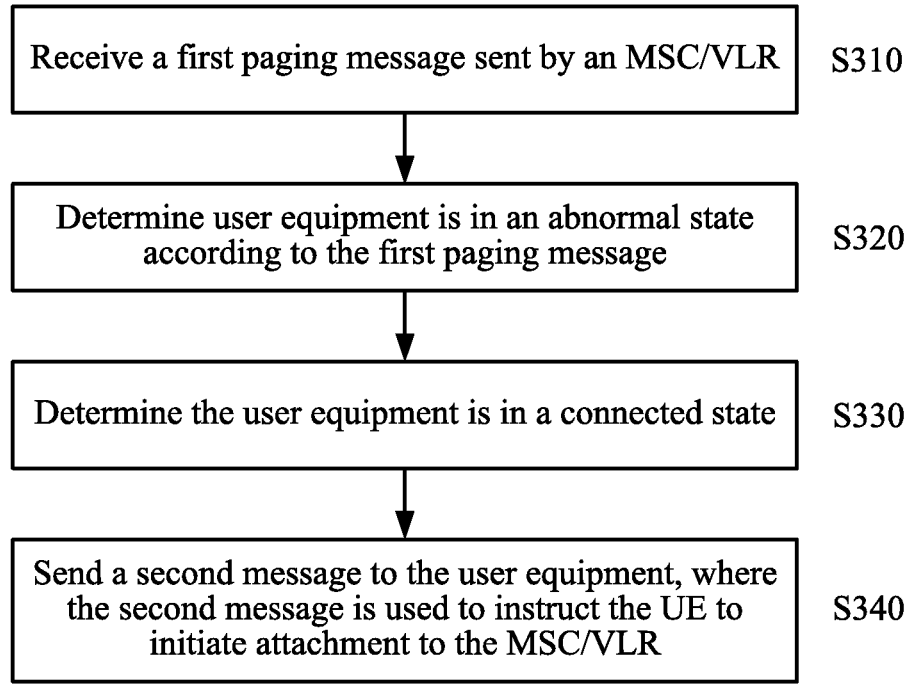
FIG. 3 is a schematic flow chart of a method for receiving a short message according to another embodiment of the present invention.

When the user equipment is in an abnormal state and the receiving of a short message is influenced, the first message sent by the MSC/VLR and received by the mobile management device may be a first paging message, and at this time, the method for receiving a short message according to an embodiment of the present invention is shown in FIG. 2 and FIG. 3. FIG. 2 shows a schematic flow chart of a method 200 for receiving a short message according to an embodiment of the present invention. As shown in FIG. 2, the method 200 includes:

In S210, a mobile management device receives a first paging (Paging) message sent by the MSC/VLR, where the first paging message carries an international mobile subscriber identification number (IMSI) of the UE, and a service type carried by the first paging message is a short message. Because the MSC/VLR cannot process the short message service for the UE, for example, the user equipment is in an abnormal state due to reasons such as a failure of the MSC/VLR, for example, a context of the UE is lost, or an SGs connection established for the UE in the MSC/VLR is released, that is, in a SGs-Null state. At this time, the MSC/

VLR executes the IMSI paging processing, that is, the first paging message does not carry information such as a UE location area identity (LAI) and/or a temporary mobile subscriber identity (TMSI).

In S220, the mobile management device determines that the user equipment is in an abnormal state according to the first paging message. Specifically, according to that the first paging message does not carry the location area identity LAI or does not carry the TMSI of the user equipment, or according to that the first paging information does not carry the LAI and the TMSI, the mobile management device may determine that the user equipment is in an abnormal state, for example, the context of the UE does not exist, or the SGs connection is released.

In S230, the mobile management device determines that the user equipment is in an idle state.

In S240, when the user equipment is in the idle state, the mobile management device sends a second paging message to the user equipment, where the second paging message is used to instruct the user equipment to initiate attachment to the MSC/VLR.

In the embodiment of the present invention, a paging type and/or a paging cause value of the second paging message may be used to instruct the user equipment to initiate the attachment to the MSC/VLR. Optionally, the paging type of the second paging message may be set to be IMSI detach, IMSI attach or IMSI re-attach, and so on. The paging cause value of the second paging message may be a paging cause value corresponding to the paging type, for example, may be set to that the CS Service is not allowed, that the IMSI is unknown, or the invalid context. It should be understood that under the teaching of the embodiment of the present invention, other paging types and/or paging cause values may be set for the second paging message, so as to instruct the user equipment to initiate attachment to the MSC/VLR, which all shall fall in the protection scope of the present invention.

At this time, the user equipment identity in the second paging message may be a temporary identity S-TMSI (S-Temporary Mobile Subscriber Identity) assigned for the UE by an EPS network, the S-TMSI may be obtained from the context of the UE existing in the MME by the MME according to the IMSI of the UE, and a core network domain indicator in the second paging message may be set to be a PS or a CS.

In the embodiment of the present invention, the second paging message may include a specific combination of the user equipment identity and the core network domain identity, the specific combination of the user equipment identity and the core network domain identity is used to instruct the user equipment to initiate the attachment to the MSC/VLR. Optionally, when the context of the UE exists in the MME, the second paging message may include a specific combination of the user equipment identity being the IMSI and the core network domain identity being the CS. Optionally, when the MME does not have the valid context of the UE, the second paging message may include a specific combination of the user equipment identity being the IMSI and the core network domain identity being the PS.

FIG. 3 shows a schematic flow chart of a method 300 for receiving a short message according to another embodiment of the present invention. As shown in FIG. 3, the method 300 includes the following steps.

S310: Receive a first paging message sent by an MSC/VLR.

S320: Determine that a user equipment is in an abnormal state according to that the first paging message does not include an LAI and/or a TMSI.

S330: Determine that the user equipment is in a connected state.

S340: Send a second message to the user equipment, where the second message is used to instruct the user equipment to initiate attachment to the MSC/VLR.

S310 and S320 in the method 300 are the same as S210 and S220 in the method 200, which are not described herein again for conciseness.

In S330, a mobile management device determines that the user equipment is in an idle state, and sends a paging message to the user equipment, and the user equipment executes the service request processing to respond to the paging message and transfers the state of the user equipment to the connected state. The processing described above is an existing standard processing method, which is not described herein again.

In S340, when the user equipment is in a connected state, the mobile management device sends the second message to the user equipment, where the second message is used to instruct the user equipment to initiate the attachment to the MSC/VLR. Specifically, the type of the second message and/or the cause value included in the second message may be used to instruct the user equipment to initiate attachment to the MSC/VLR.

In the embodiments of the present invention, optionally, the second message is a detach request message, and the detach type of the detach request message and/or the cause value included in the detach request message are used to instruct the user equipment to initiate attachment to the MSC/VLR. Specifically, the detach type of the detach request message may be set to be IMSI detach, IMSI attach or IMSI re-attach, and so on, and the detach cause value of the detach request message may be a cause value corresponding to the detach type, for example, may be set to that the CS Service is not allowed, that the IMSI is unknown, or the invalid context, and so on. It should be understood that the embodiment of the present invention is described by merely taking the three detach types as examples for illustration, but the present invention is not limited thereto. Under the teaching of the embodiment of the present invention, other types and/or cause values may be set for the detach request message, to instruct the user equipment to initiate attachment to the MSC/VLR, which all shall fall in the protection scope of the present invention.

Optionally, the second message is a circuit switched CS service notification message, and the CS service notification message includes information of instructing the user equipment to initiate attachment to the MSC/VLR. The type of the CS service notification message and/or the cause value included in the CS service notification message are used to instruct the user equipment to initiate attachment to the MSC/VLR. Specifically, the CS service notification message carries an information element indicating that the UE needs to initiate attachment to the MSC/VLR (that is, the type and/or the cause value of the message), and the type of the CS service notification message is set to be, for example, IMSI detach, IMSI attach, and IMSI re-attach, and the cause value included by the CS service notification message may be the cause value corresponding to the type, for example, may be set to that the CS Service is not allowed, that the IMSI is unknown, or the invalid context, and so on.

Optionally, the second message is a notification message, and the notification message carries information of instructing the user equipment to initiate attachment to the MSC/VLR. The type of the notification message and/or the cause value included in the notification message are used to instruct the user equipment to initiate attachment to the MSC/VLR. Specifically, the notification message carries an information element indicating that the UE needs to initiate attachment to the MSC/VLR (that is, the type and/or the cause value of the message). For example, the information element may be set to be one of the following types: IMSI detach, IMSI attach or IMSI re-attach, and the cause value of the information element may be the cause value corresponding to the type, for example, it may be set to that the CS Service is not allowed, that the IMSI is unknown, or the invalid context, and so on.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

When the user equipment is in an abnormal state and therefore the sending of a short message is affected, the first message sent by the MSC/VLR and received by the mobile management device may be a release request message.

At this time, as shown in FIG. 1, in S120, the determining that the user equipment is in an abnormal state according to the first message includes: determining that the user equipment is in an abnormal state according to the cause value of the release request message.

Specifically, for example, when the context of the UE is lost, or the MSC/VLR does not have the valid context of the UE, or the SGs connection of the UE is released due to reasons such as a failure of the MSC/VLR, the MSC/VLR sends a release request message to the MME, and the cause value of the release request message indicates that the IMSI of the user equipment is unknown ("IMSI Unknown"); and when the SGs connection established for the UE is released due to a failure of the MSC/VLR, that is, the SGs connection is in the SGs-Null state, the cause value of the release request message sent by the MSC/VLR to the MME indicates that the IMSI of the user equipment is detached ("IMSI detached for non-EPS services").

In S130, the mobile management device sends the second message to the user equipment, and the second message is used to instruct the user equipment to initiate the attachment to the MSC/VLR, so that the user equipment can receive and send a short message. Optionally, the type of the second message and/or the cause value included in the second message may be used to instruct the user equipment to initiate attachment to the MSC/VLR. Optionally, the second message is a detach request message, a CS service notification message or a notification message. Optionally, the type of the second message may be IMSI detach, IMSI attach or IMSI re-attach, and so on. The cause value of the second message may be the cause value corresponding to the type, for example, may be set to that the CS Service is not allowed, that the IMSI is unknown, or the invalid context, and so on.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

In the above, the method for receiving or sending a short message provided by the embodiment of the present invention is described in detail from the perspective of the mobile management device, and in the following, the method for receiving or sending a short message provided by the embodiments of the present invention in detail from the perspective of the user equipment.

Figure 4:
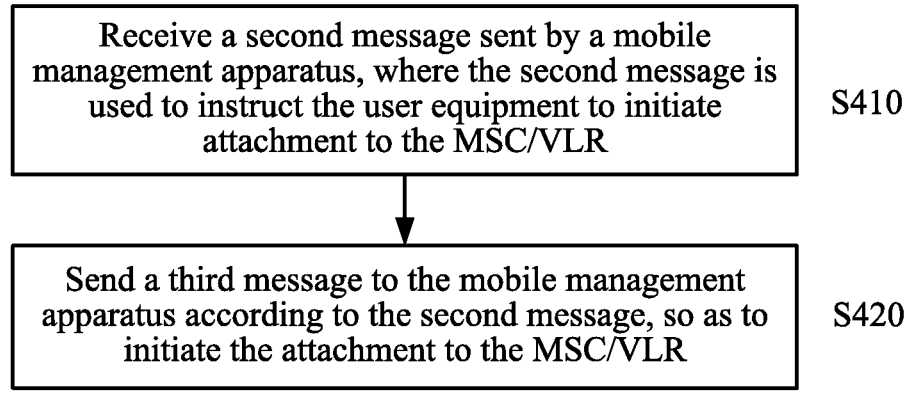
FIG. 4 is a schematic flow chart of a method for receiving or sending a short message according to another embodiment of the present invention.

FIG. 4 shows a schematic flow chart of a method 400 for sending a short message according to another embodiment of the present invention. As shown in FIG. 4, the method 400 includes the following steps.

S410: Receive a second message sent by a mobile management device, where the second message is used to instruct the user equipment needs to initiate attachment to the MSC/VLR.

S420: Send a third message to the mobile management device according to the second message, so as to initiate the attachment to the MSC/VLR.

When the user equipment is in an abnormal state, for example, the context of the user equipment in the MSC/VLR is lost, or the MSC/VLR cannot process the short message of the user, due to reasons such as a failure of the MSC/VLR, for example, a board reset, or the recovery of the MSC/VLR from the failure, and at this time, the MSC/VLR indicates the mobile management device that the current process fails. In order to achieve receiving or sending a short message, according to the embodiment of the present invention, the mobile management device sends the second message that is used to instruct the user equipment to initiate attachment to the MSC/VLR, to the user equipment, and after receiving the second message, the user equipment sends the third message to the mobile management device, so as to initiate the attachment to the MSC/VLR, so that the user equipment can receive or send a short message normally.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

In the embodiment of the present invention, the second message may be a second paging message, a detach request message, a CS service notification message, or a notification message, and these messages may all be used to instruct the user equipment to initiate attachment to the MSC/VLR, and are described in different situations in the following.

In the embodiment of the present invention, optionally, the third message is a tracking area update request message or an attach request message. That is, according to the second message, the user equipment may send a tracking area update request message or an attach request message to the mobile management device, so that the user equipment can re-register on the MSC/VLR, and establish the context of the user equipment on the MSC/VLR, and the user equipment can receive or send a short message normally.

In the embodiment of the present invention, the method according to the embodiment of the present invention may include a method for receiving a short message and a method for sending a short message, which are described in the following.

When the user equipment is in an abnormal state and the receiving of a short message is affected, the MSC/VLR may send an IMSI paging message to the mobile management device, to enable the mobile management device to know that the user equipment is in an abnormal state and cannot receive the short message normally. At this time, when the user equipment is in an idle state, the mobile management device sends a second message, which is a second paging message, to the user equipment, where the second paging message instruct the user equipment to initiate attachment to the MSC/VLR, and the user equipment may send a tracking area update request message or an attach request message to the mobile management device according to the second paging message, thereby facilitating receiving the short message.

Optionally, the user equipment sends a tracking area update request message or an attach request message to the mobile management device according to the paging type or the paging cause value of the second paging message. The type of the tracking area update request message may be a combined Tracking Area/Location Area (TA/LA) update or a periodic TA update. The type of the attach request message may be a combined EPS/IMSI attach.

Specifically, when the user equipment receives the second paging message a paging type of which is IMSI detach, IMSI attach or IMSI re-attach, or when the user equipment receives the second paging message a paging cause value of which is the cause value corresponding to the paging type, for example, the value is that the CS Service is not allowed, that the IMSI is unknown, or the invalid context, the user equipment may send a tracking area update request message or an attach request message to the mobile management device.

In the embodiment of the present invention, the user equipment may send a tracking area update request message or an attach request message to the mobile management device according to a specific combination of a user equipment identity and a core network domain identity in the second paging message.

Optionally, the user equipment sends the tracking area update request message or the attach request message to the mobile management device according to that the specific combination of the user equipment identity and the core network domain identity in the second paging message is a specific combination of the international mobile subscriber identification number IMSI and the circuit switched CS, where the type of the tracking area update request message may be combined TA/LA update or periodic TA update, and the type of the attach request message may be combined EPS/IMSI attach.

Optionally, the user equipment sends the attach request message to the mobile management device according to that the specific combination of the user equipment identity and the core network domain identity in the second paging message is the specific combination of the IMSI and the packet switch PS. The type of the attach request message is combined EPS/IMSI attach.

When the mobile management device receives the IMSI paging message sent by the MSC/VLR, which demonstrates that the user equipment is in an abnormal state and the receiving of a short message is influenced, if the user equipment is in a connected state or is transferred from an idle state to a connected state, the mobile management device sends the second message to the user equipment, so as to instruct the user equipment to initiate attachment to the MSC/VLR.

When the user equipment is in an abnormal state and therefore the sending of a short message is affected, the mobile management device receives the first message sent by the MSC/VLR, where the first message may be a release request message. The mobile management device may send the second message to the user equipment to instruct the user equipment to initiate attachment to the MSC/VLR, after it is determined that the user equipment is in an abnormal state according to the cause value of the release request message.

In the embodiment of the present invention, the type of the second message and/or the cause value included in the second message may be used to instruct the user equipment to initiate attachment to the MSC/VLR. Optionally, the second message is a detach request message, a CS service notification message or a notification message. For detailed description of the second message, reference may be made to the relevant description in the methods 100 to 300 described above, which is not be described herein again for briefness.

After a user equipment receives a second message sent by a mobile management device, the method 500 for sending a short message according to the embodiment of the present invention may further include the following steps.

S530: The user equipment sends a fourth message for responding to the second message to the mobile management device. For example, the fourth message may be a detach accept message.

Before, after or at the same time that the user equipment sends a tracking area update request message or an attach request message to the mobile management device, the method 500 may further include:

S540: Send a pause indicator to a short message service protocol stack or an application on the user equipment, where the pause indicator is used to instruct to pause the sending of a short message.

Optionally, the method 500 may further include the following steps.

S550: Send a resend indicator to the short message service protocol stack or the application on the user equipment after receiving a message responding to the third message sent by the mobile management device, where the resend indicator is used to instruct to restart the sending of the short message.

For example, after the user equipment receives a tracking area update accept message or an attach accept message that is sent by the mobile management device and responds to the tracking area update request message or the attach request message, the user equipment sends the resend indicator to the short message service protocol stack or the application on the user equipment, to resend the short message.

S510 and S520 in the method 500 are the same as S410 and S420 in the method 400, which are not described herein again.

It should be understood that the magnitude of serial numbers of the procedure described above does not mean the execution sequence, the execution sequence of the procedure should be determined by the function and the internal logic, and the implementing procedure of the embodiment of the present invention should not be restricted.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

The method for receiving or sending a short message according to the embodiment of the present invention are described in detail in the following by taking receiving or sending a short message in an EPS network.

Figure 6:
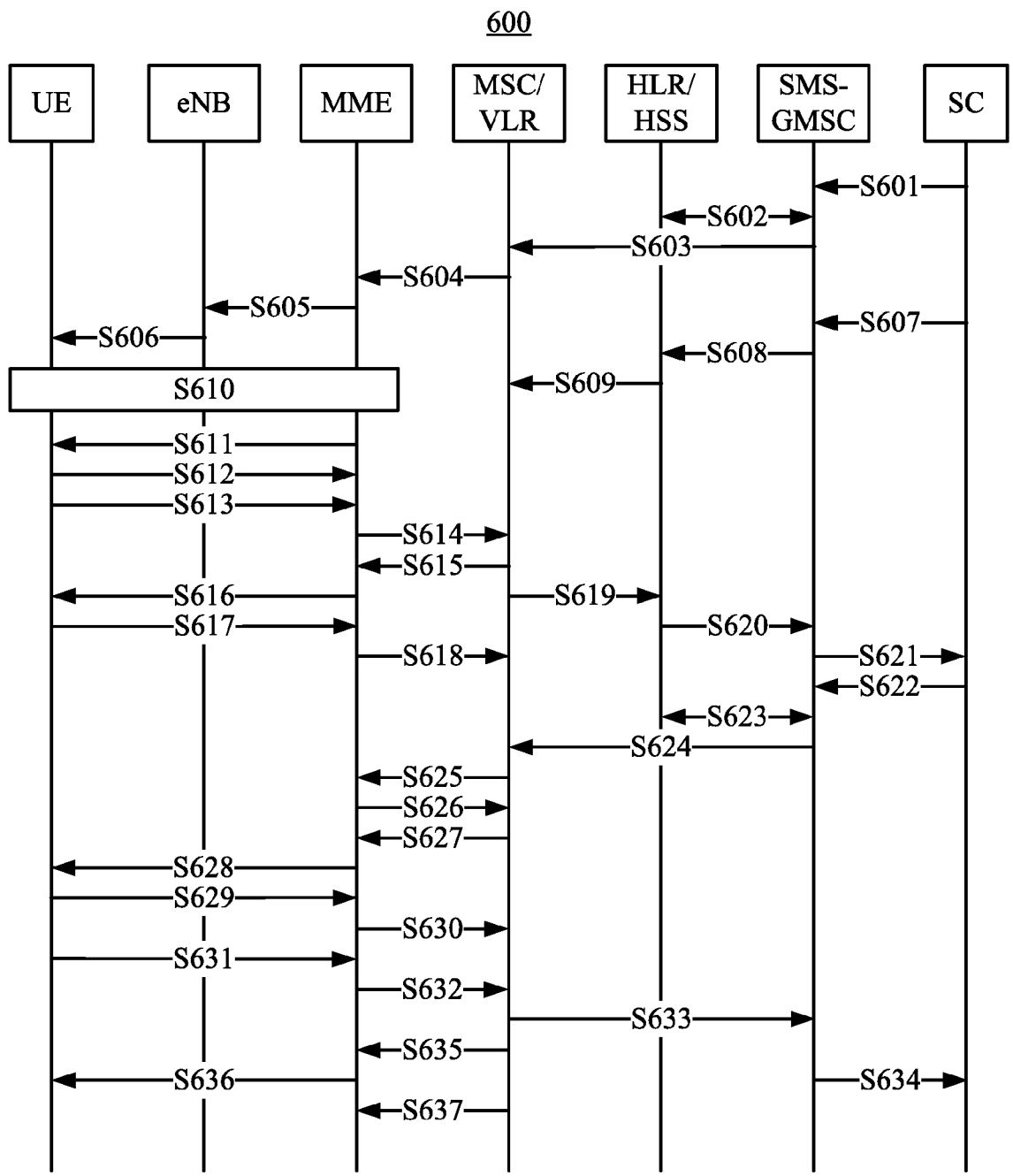
FIG. 6 is a schematic flow chart of a method for receiving a short message according to another embodiment of the present invention.

FIG. 6 shows a schematic flow chart of a method 600 for receiving a short message according to an embodiment of the present invention, and the embodiment is for a scenario in which a user equipment receives the short message, that is, an MT SMS scenario. As shown in FIG. 6, the method 600 includes the following steps.

S601: A short message service center SC sends a short message to an SMS-GMSC.

S602: The SMS-GMSC executes route information query processing, and obtains the MSC/VLR where the UE attaches currently from a home location register HLR home subscriber server HSS.

S603: The SMS-GMSC forwards the short message to the MSC/VLR where the UE attaches.

S604: When the user equipment is in an abnormal state and cannot process the short message service for the UE, for example, the context of the UE is lost due to a failure of the MSC/VLR, or SGs connection established for the UE in the MSC/VLR is released, that is, in the SGs-Null state, the MSC/VLR executes the IMSI paging processing, that is, sends a paging message to the MME, where the paging message carries the IMSI of the UE, but does not carry the location area identity LAI of the UE, and the service type of the paging message is a short message.

At this time, the MSC/VLR may also immediately feedback the failure of sending the short message to the SC via the SMS-GMSC, and S607 is executed after the SC receives the feedback response. The MSC/VLR may also buffer the short message, so as to immediately send the buffered short message after the UE attaches to the MSC/VLR subsequently.

If the UE is in an idle state currently, the process proceeds to S605 and S606, then proceeds to S613; and if the UE is in a connected state currently, the paging process is not executed, and the process directly proceeds to S611.

S605: The UE is in an idle state currently, and at this time, the MME sends the paging message to an evolved node B eNB, where the paging message carries an identity of the UE and a core network domain indicator (CN Domain).

If the paging message does not include the information of instructing the user equipment to initiate the attachment to the MSC/VLR, the paging message sent by the eNB to the UE in step 606 does not include the information of instructing the user equipment to initiate the attachment to the MSC/VLR either, and step S610 is executed.

According to the UE context information recorded in the MME, the paging message may instruct the UE to initiate the attachment to the MSC/VLR or the attachment to the MME and the MSC/VLR:

1) When the context of the UE exists in the MME:

a) The paging message includes an indicator requiring the UE to initiate the attachment to the MSC/VLR, the attachment indicator may be represented by an information element such as a specific paging cause value or a paging type, its value may be set to be the following types specifically: "IMSI detach", "IMSI attach" or "IMSI re-attach", and so on, and the paging cause value may be set to be a cause value corresponding to the type. For example, it may be set to that the CS Service is not allowed, that the IMSI is unknown, or the invalid context, and so on. At this time, the user identity in the paging message may be a temporary identity S-TMSI assigned for the UE by an EPS network, and the core network domain indicator may be set to be the PS or the CS, where the temporary identity S-TMSI may be obtained from the context of the UE in the MME by the MME according to the IMSI of the UE.

b) The paging message described above instructs the user equipment to initiate the attachment to the MSC/VLR via the specific UE identity and the core network domain indicator, for example, the user identity in the paging message is the IMSI received by the MME in S604, and the core network domain indicator is set to be the CS.

2) When no valid context of the UE exists in the MME, the user identity in the paging message described above is the IMSI received by the MME in S604, for instructing the user equipment to initiate a combined EPS/IMSI attach process to the MME and the MSC/VLR, and at this time, the core network domain indicator may be set to be the PS.

S606: The eNB sends the paging message to the UE according to the paging message received from the MME. The paging message carries the identity of the UE, the core network domain identity and the indicator instructing the UE to initiate the attachment provided in S605.

S607: When the short message service center SC cannot send the short message successfully, for example, the send timer is expired, or a short message sending failure indicator sent by the MSC/VLR is received, a UE reachability notification request (UE Reachability Notification Request) message is sent to the SMS-GMSC, and the short message is buffered.

S608: The SMS-GMSC sends the UE reachability notification request (UE Reachability Notification Request) message to the HLR/HSS.

S609: The HLR/HSS sends the UE reachability notification request (UE Reachability Notification Request) message to the MSC/VLR. The MSC/VLR may set the notification request identity.

It should be understood that the magnitude of reference numbers of the procedure described above does not mean the execution sequence. The execution sequence of the procedure should be determined by the function and the internal logic, and the implementing procedure of the embodiment of the present invention should not be restricted. For example, the S607 to S609, the previous S604 to S606, and the later S611 to S615 do not have time sequence relations.

S610: If the paging message received by the UE in S606 does not include the indicator of instructing the UE to initiate the attachment to the MSC/VLR, the UE executes a service request process to establish a signaling connection to turn the user into the connected state, and the process proceeds to S611.

If the paging message received by the UE in S606 includes the indicator of instructing the user equipment to initiate the attachment to the MSC/VLR, the UE does not execute S610, that is, the UE does not execute the service request process, and the process proceeds to S613.

S611: The UE is in a connected state currently, and at this time, the MME sends the notification message to the UE according to the indicator received in S604, so as to instruct the user equipment to initiate the attachment to the MSC/VLR.

The notification request message instructing the user equipment to initiate the attachment to the MSC/VLR may include the following types of implementation.

1) The notification request message may be a detach request (Detach Request) message, where a detach type (Detach Type) in the detach request message or a cause (cause)

value in the detach request message is set to indicate that the UE needs to initiate the attachment to the MSC/VLR.

The detach type may be set to be the following types: "IMSI detach", "IMSI attach" or "IMSI re-attach", and so on. The detach cause value may be set to be the cause value corresponding to the detach type. For example, it may be set to that the CS Service is not allowed, that the IMSI is unknown, or the invalid context, and so on.

2) The notification request message may be a CS service notification message. The CS service notification message carries the information element indicating that the UE needs to initiate the attachment to the MSC/VLR (that is, the type and/or the cause value of the message). For example, the message type may be set to be the following types: "IMSI detach", "IMSI attach" or "IMSI re-attach", and so on, and similarly, the cause value of the message may be set to be the cause value corresponding to the type. For example, it may be set to that the CS Service is not allowed, that the IMSI is unknown, or the invalid context, and so on.

3) The notification request message may be a notification message, and the notification message carries the information element indicating that the UE needs to initiate the attachment to the MSC/VLR, (that is, the type and/or the cause value of the message). For example, the notification indicator information element in the notification message may be set to be one of the following types: "IMSI detach", "IMSI attach" or "IMSI re-attach", and similarly, the cause value of the notification indicator information element may be set to be the cause value corresponding to the type. For example, the cause value of the notification indicator information element may be set to that the CS Service is not allowed, that the IMSI is unknown, or the invalid context, and so on.

S612: The UE may send a notification response message responding to the notification request message to the MME, where the notification response message is, for example, a detach accept message.

S613: The UE originates a tracking area update process or an attach process according to the indicator received in S606 or S611.

Specifically, when one of the following conditions is met, the UE originates the tracking area update process or the attach process, and sends a tracking area update request message to the MME. An update type is combined TA/LA update or periodic TA update, and the type of the attach request message may be combined EPS/IMSI attach.

1) The UE receives the indicator of instructing the user equipment to initiate the attachment to the MSC/VLR, for example, "IMSI detach", "IMSI attach" or "IMSI re-attach", and so on.

2) The UE receives the specific combination of the UE identity and the core network domain indicator. For example, the identity of the UE is the IMSI and the core network domain indicator is the CS.

When one of the following conditions is met, the UE originates the attach process, and sends an attach request message to the MME, and the attach type is combined EPS/IMSI attach.

1) The UE receives the specific combination of the UE identity and the core network domain indicator. For example, the identity of the UE is the IMSI, and the core network domain indicator is the PS.

S614: The MME originates registration to the MSC/VLR, and sends a location update request message to the MSC/VLR.

S615: The MSC/VLR establishes the context of the UE, assigns a temporary mobile subscriber identity TMSI for the UE, and sends the location update accept message to the MME.

S616: The MME sends a tracking area accept (Tracking Area Accept) message or an attach accept message to the UE.

S617: The UE may send a tracking area complete (Tracking Area Complete) message or an attach complete message to the MME.

S618: After receiving a complete message sent by the UE, the MME sends a TMSI reallocation message to the MSC/VLR.

If the MSC/VLR buffers the short message of the UE (for example, proceeding buffering in S604), the MSC/VLR may execute S625 directly, after receiving the service request message of S626, execute S627 to send the short message to the UE; and S625 and S626 may also be omitted, and execute S627 directly to send the short message to the UE. The processing may also be executed immediately after S615.

S619: If the MSC/VLR sets the notification request identity in S609, the MSC/VLR sends a UE activity notification message to the HLR/HSS.

S620: The HLR/HSS sends the UE activity notification message to the SMS-GMSC.

S621: The SMS-GMSC sends the UE activity notification message to the short message service center SC.

S622: The short message service center resends the buffered short message to the SMS-GMSC.

S623: The SMS-GMSC queries the HLR/HSS for the MSC/VLR where the UE attaches currently.

S624: The SMS-GMSC forwards the short message to the MSC/VLR where the UE attaches.

S625: The MSC/VLR sends a paging message, which carries information such as the IMSI of the UE and the location area identity of the user equipment, to the MME, and the service type is a short message.

If the UE is in the idle state in the MME, after receiving the paging message, the MME needs to execute a standard paging process first, after the UE receives the paging message, originate the service request process, and turn the UE into the connected state, which is not described herein again for briefness.

S626: The MME sends a service request message to the MSC/VLR.

S627: The MSC/VLR encapsulates the short message into a downlink data transport message and sends the message to the MME.

S628: The MME encapsulates the short message into a downlink NAS transport message and sends the message to the UE.

S629: The UE encapsulates a short message determining message into an uplink NAS transport message and sends the message to the MME.

S630: The MME encapsulates the short message service determining message into an uplink data transport (Uplink Unitdata) message and sends the message to the MSC/VLR.

S631: The UE encapsulates a short message delivery report into the uplink NAS transport message and sends the message to the MME.

S632: The MME encapsulates the short message delivery report into the uplink data transport (Uplink Unitdata) message and sends the message to the MSC/VLR.

S633: The MSC/VLR sends the short message delivery report to the SMS-GMSC.

S634: The SMS-GMSC sends the short message delivery report to the SC.

S635: The MSC/VLR determines that the short message delivery report is encapsulated into the downlink data transport (Downlink Unitdata) message and sends the message to the MME.

S636: The MME determines that the short message delivery report is encapsulated into the downlink NAS transport message and sends the message to the UE.

S627: The MSC/VLR sends a release request message to the MME.

It should be understood that the magnitude of serial numbers of the procedure described above does not mean the execution sequence, the execution sequence of the procedure should be determined by the function and the internal logic, and the implementing procedure of the embodiment of the present invention should not be restricted. For example, S635 and S633 do not have a time sequence relation.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

Figure 7:
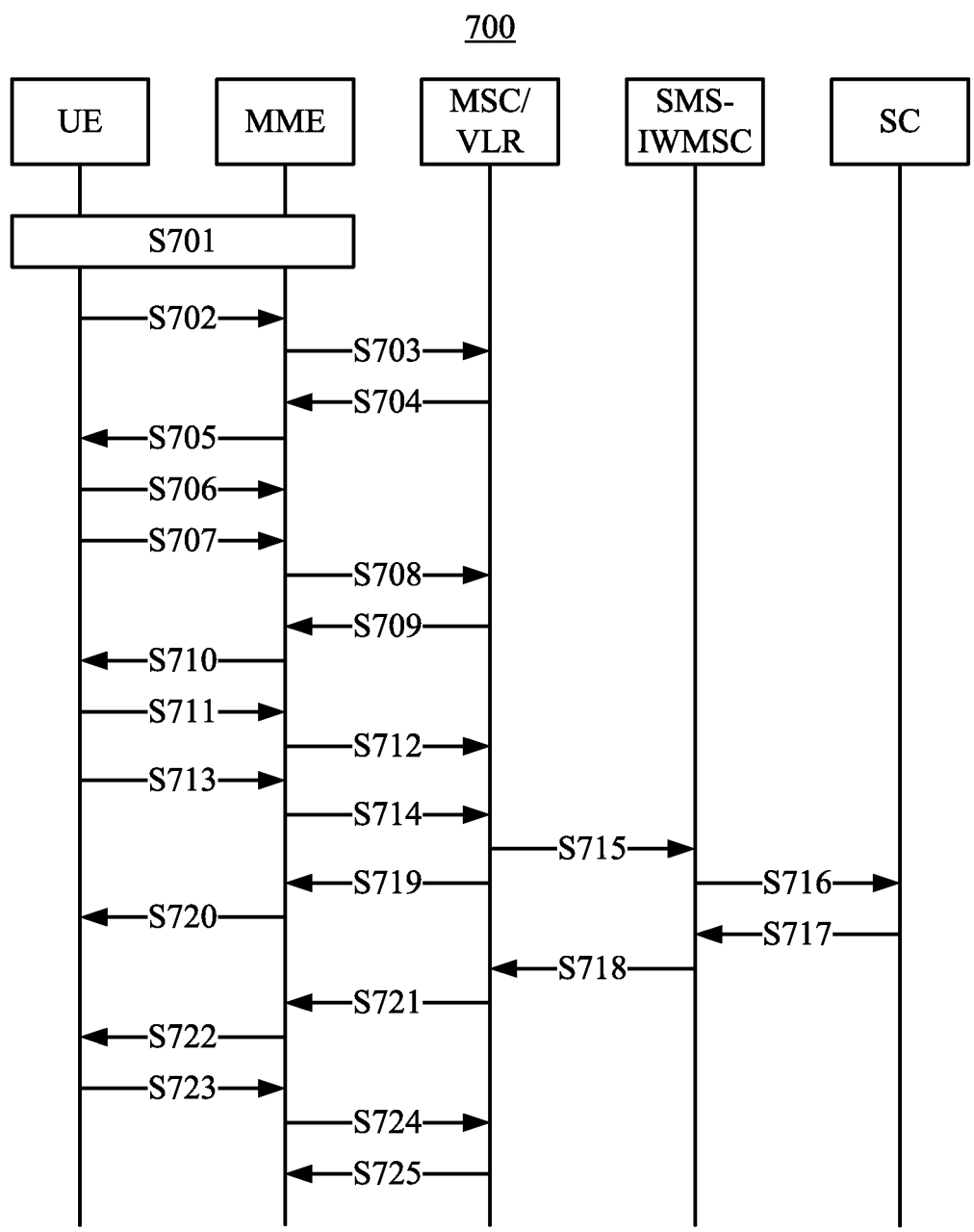
FIG. 7 is a schematic flow chart of a method for sending a short message according to another embodiment of the present invention.

FIG. 7 shows a schematic flow chart of a method 700 for sending a short message according to an embodiment of the present invention, and the embodiment is for a scenario in which a user equipment sends the short message, that is, an MO SMS scenario. As shown in FIG. 7, the method 700 includes the following steps.

S701: When a UE needs to send a short message, if the UE is in an idle state, the UE executes a service request process. That is, the UE sends a service request message to the MME, and establishes a signaling connection, to turn the UE into a connected state. If the UE is in a connected state currently, the process directly proceeds to S702.

S702: The UE encapsulates the short message, which needs to be sent, into a uplink non-access stratum (NAS) transport message and sends the message to the MME.

S703: The MME encapsulates the received short message into an uplink data transport (Uplink Unitdata) message and sends the message to the MSC/VLR.

S704: When the user equipment is in an abnormal state in the MSC/VLR and cannot process the short message for the UE, for example, the context of the UE is lost due to a failure of the MSC/VLR, or the SGs connection established for the UE in the MSC/VLR is released, that is, in an SGs-Null state, and the MSC/VLR sends a release request message to the MME, indicating that IMSI of the user equipment is unknown ("IMSI Unknown") or the IMSI of the user equipment is detached ("IMSI detached for non-EPS services").

The SGs is the name of an interface between the MME and the MSC/VLR, the SGs connection refers to a channel between the MME and the MSC/VLR established for the UE, and the state of the SGs connection is maintained on the MME and the MSC/VLR.

S705: The MME sends a notification request message to the UE according to the indicator received in S704 to instruct the UE to initiate the attachment to the MSC/VLR.

The notification request message instructing the user equipment to initiate the attachment to the MSC/VLR may include the following types of implementation specifically:

1) The notification request message may be a detach request message, where a detach type in a detach request message or the cause value in the detach request message is set to indicate that the UE needs to initiate the attachment to the MSC/VLR.

The detach type may be set to be the following types: "IMSI detach", "IMSI attach" or "IMSI re-attach", and so on, and the detach cause value may be set to be the cause value corresponding to the detach type, for example, it may be set to that the CS Service is not allowed, that the IMSI is unknown, or the invalid context, and so on.

2) The notification request message may be a CS service notification message, the CS service notification message carries the information element indicating that the UE needs to initiate the attachment to the MSC/VLR (that is, the type and/or the cause value of the message). For example, the message type may be set to be the following types: "IMSI detach", "IMSI attach" or "IMSI re-attach", and so on, and similarly, the cause value of the message may be set to be the cause value corresponding to the type, for example, it may be set to that the CS Service is not allowed, that the IMSI is unknown, or the invalid context, and so on.

3) The notification request message may be a notification message, and the notification message carries the information element indicating that the UE needs to initiate the attachment to the MSC/VLR (that is, the type and/or the cause value of the message). For example, the notification indicator information element in the notification message may be set to be one of the following types: "IMSI detach", "IMSI attach" or "IMSI re-attach", and so on, and similarly, the cause value of the notification indicator information element may be set to be the cause value corresponding to the type, for example, the cause value of the notification indicator information element may be set to that the CS Service is not allowed, that the IMSI is unknown, or the invalid context, and so on.

S706: The UE may send a notification response message responding to the notification request message to the MME, where the notification response message is, for example, a detach accept message, and so on.

S707: The UE originates a tracking area update process or the attach process, and sends a tracking area update (TAU) request message or an attach request message to the MME according to the received indicator of initiating the attachment to the MSC/VLR in S705, for example, "IMSI attach", "IMSI detach", and so on. The type of the tracking area update request message may be combined TA/LA update, or periodic TA update; and the type of the attach request message is combined update.

Before or after originating the tracking area update, or at the same time, the UE may further indicate pausing the sending of the short message by the short message service protocol stack/application on the UE.

S708: The MME originates registration to the MSC/VLR, and sends a location update request message to the MSC/VLR.

S709: The MSC/VLR establishes the context of the UE, assigns the TMSI for the UE, and sends a location update accept message to the MME.

S710: The MME sends a tracking area accept message or an attach accept message to the UE.

S711: The UE may send a tracking area complete message or an attach complete message to the MME.

After receiving the accept message of S710, the UE may instruct the short message service protocol stack/application on the UE to resend the short message.

S712: After receiving the complete message in the S711, the MME sends a TMSI reallocation message to the MSC/VLR.

S713: The UE encapsulates the short message, which needs to be sent, into an uplink NAS transport message and sends the message to the MME.

S714: The MME encapsulates the received short message into an uplink data transport (Uplink Unitdata) message and sends the message to the MSC/VLR.

S715: The MSC/VLR sends the received short message to an SMS-IWMSC.

S716: The SMS-IWMSC sends the received short message to the short message service center SC.

S717: The short message service center SC sends a short message delivery report to the SMS-IWMSC.

S718: The SMS-IWMSC sends the short message delivery report (delivery report) to the MSC/VLR.

S719: The MSC/VLR sends a short message determining message to the MME.

S720: The MME sends the short message determining message to the UE.

S721: After receiving the short message delivery report of S718, the MSC/VLR encapsulates the received short message delivery report into a downlink data transport (Downlink Unitdata) message and sends the message to the MME.

S722: The MME encapsulates the short message delivery report into a downlink NAS transport message and sends the message to the UE.

S723: The UE determines that the short message delivery report is received, and encapsulates a determining result into an uplink NAS transport message and sends the message to the MME.

S724: The MME encapsulates the received determining result into an uplink data transport message and sends the message to the MSC/VLR.

S725: The MSC/VLR sends a release request message to the MME to finish the short message sending process.

It should be understood that the magnitude of serial numbers of the procedure described above does not mean the execution sequence, the execution sequence of the procedure should be determined by the function and the internal logic, and the implementing procedure of the embodiment of the present invention should not be restricted. For example, the S719 does not have a time sequence relation with S714 to S717, and S719 may be sent before, after or at the same time with S714.

According to the method for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

In the following, an apparatus for receiving or sending a short message according to an embodiment of the present invention is described in detail with reference to FIG. 8 to FIG. 11.

Figure 8:
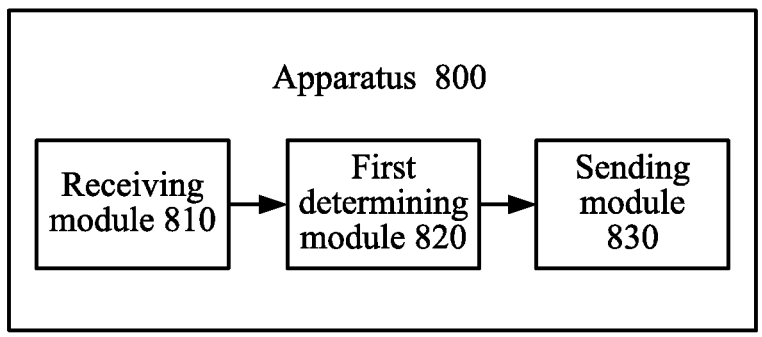
FIG. 8 is a schematic block diagram of an apparatus for receiving or sending a short message according to an embodiment of the present invention.

FIG. 8 shows a schematic block diagram of an apparatus for receiving or sending the short message according to an embodiment of the present invention. As shown in FIG. 8, the apparatus 800 includes a receiving module 810, a first determining module 820 and a sending module 830. The receiving module 810, which is configured to receive a first message sent by an MSC/VLR. The first determining module 820 is configured to determine that a user equipment is in an abnormal state according to the first message. The sending module 830 is configured to send a second message to the user equipment, where the second message is used to instruct the user equipment to initiate attachment to the MSC/VLR.

According to the apparatus for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

Figure 9A:
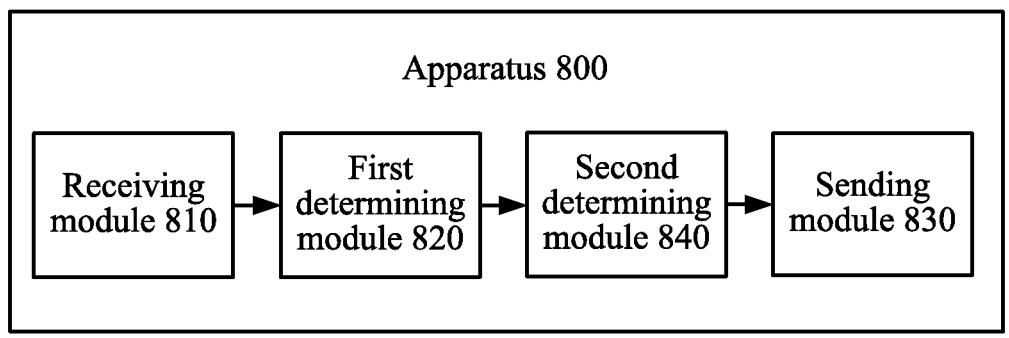
FIG. 9A and FIG. 9B are a schematic block diagram of an apparatus for receiving or sending a short message according to another embodiment of the present invention.

Optionally, as shown in FIG. 9A, an apparatus 800 for receiving or sending a short message according to the embodiment of the present invention further includes a second determining module 840, which is configured to determine that the user equipment is in an idle state when the first message is a first paging message.

The sending module 830 is specifically configured to send a second paging message to the user equipment, where the second paging message instructing the user equipment to initiate attachment to the MSC/VLR.

Figure 9B:
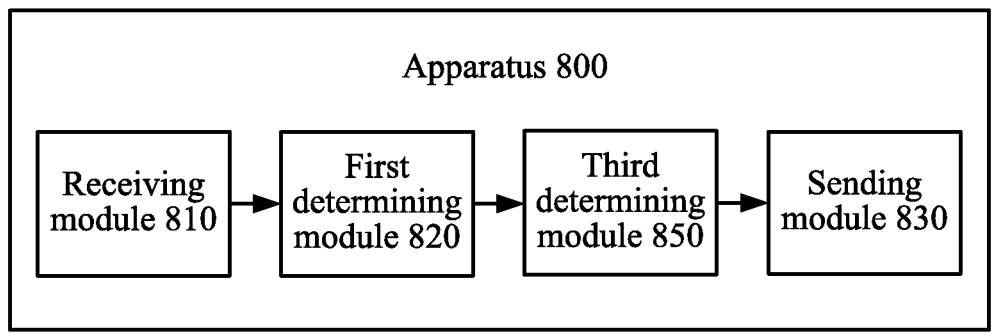

Optionally, as shown in FIG. 9B, the apparatus 800 further includes a third determining module 850, configured to determine that the user equipment is in a connected state when the first message is the first paging message and before the sending module sends the second paging message.

The apparatus 800 for sending a short message according to the embodiment of the present invention may correspond to the mobile management device in the embodiments of the present invention, and the abovementioned and other operations and/or functions of the modules in the apparatus 800 are used to implement corresponding processes of the method 100 to the method 300 in FIG. 1 to FIG. 3, which are not described herein again for briefness.

According to the apparatus for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

Figure 10:
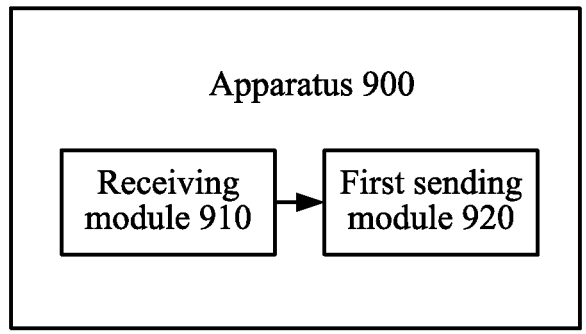
FIG. 10 is a schematic block diagram of an apparatus for receiving or sending a short message according to another embodiment of the present invention.

FIG. 10 shows a schematic block diagram of an apparatus 900 for receiving or sending a short message according to an embodiment of the present invention. As shown in FIG. 10, the apparatus 900 includes a receiving module 910 and a first sending module 920.

The receiving module 910 is configured to receive a second message sent by a mobile management device, where the second message is used to instruct the device needs to initiate attachment to a mobile switch center MSC/visitor location register VLR.

The first sending module 920 is configured to send a third message to the mobile management device according to the second message, so as to initiate the attachment to the MSC/VLR.

According to the apparatus for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

Figure 11:
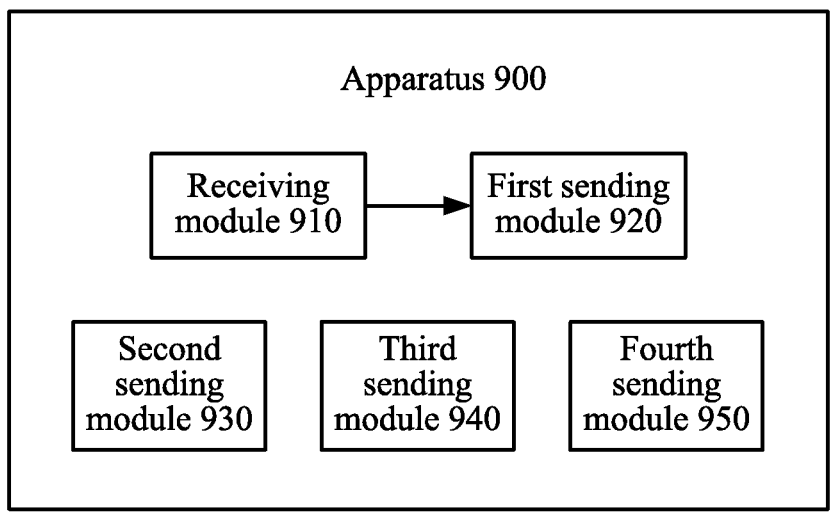
FIG. 11 is a schematic block diagram of an apparatus for receiving or sending a short message according to another embodiment of the present invention.

Optionally, as shown in FIG. 11, the apparatus 900 for receiving or sending a short message according to the embodiment of the present invention further includes a second sending module 930, which is configured to send a fourth message responding to the second message to the mobile management device after the receiving module receives the second message.

Optionally, as shown in FIG. 11, the apparatus 900 further includes a third sending module 940, which is configured to send a pause indicator to a short message service protocol stack or an application on the apparatus. The pause indicator is used to indicate pausing the sending of the short message.

Optionally, as shown in FIG. 11, the apparatus 900 further includes a fourth sending module 950, which is configured to send a resend indicator to the short message service protocol stack or the application on the apparatus after the message responding to the third message sent by the mobile management device is received. The resend indicator is used to indicate restarting the sending of the short message.

Figure 5:
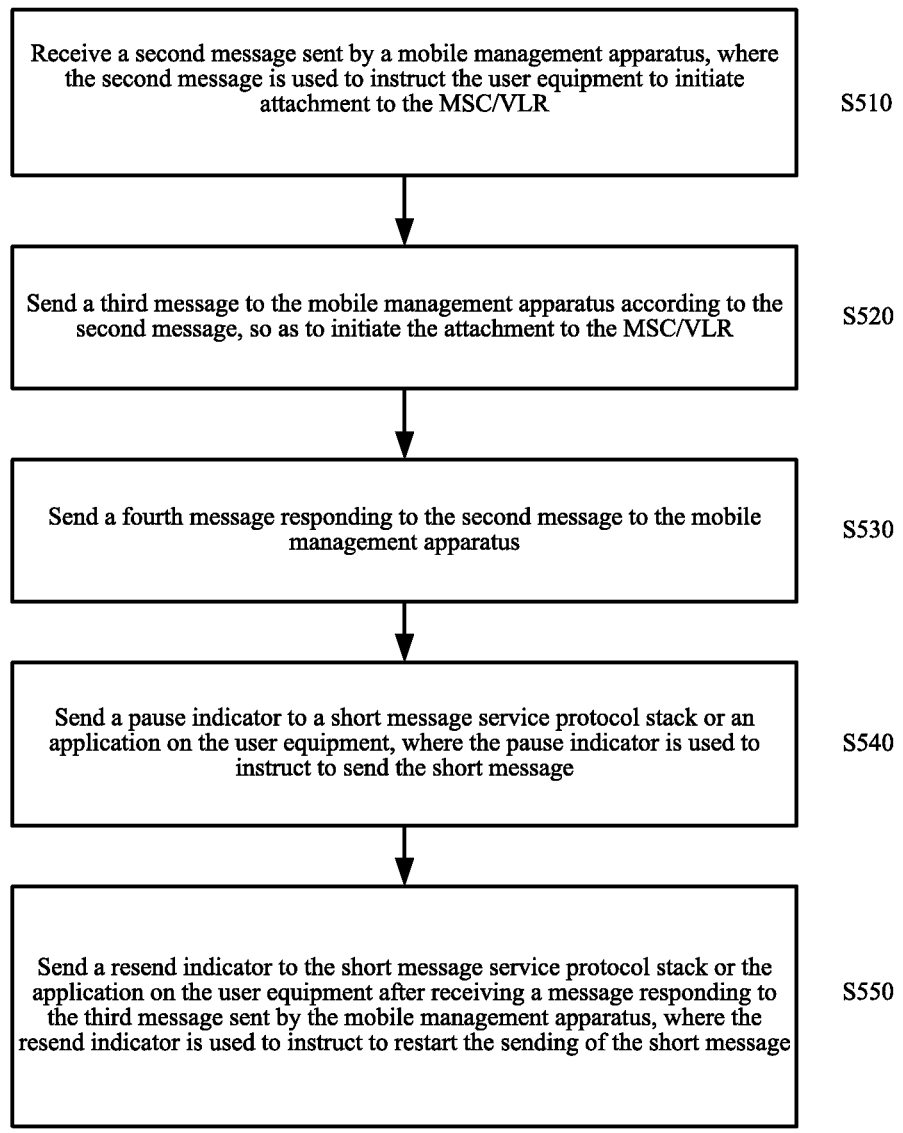
FIG. 5 is a schematic flow chart of a method for sending a short message according to an embodiment of the present invention.

The apparatus 900 for sending a short message according to the embodiment of the present invention may correspond to the user equipment in the embodiments of the present invention, and the abovementioned and other operations and/or functions of the modules in the apparatus 900 are to implement corresponding processes of the method 400 to method 500 in FIG. 4 to FIG. 5, which is not described herein again for briefness.

According to the apparatus for receiving or sending a short message provided by the embodiment of the present invention, information of instructing the user equipment to initiate attachment to the MSC/VLR is sent to the user equipment, so that the context of the user equipment can be established on the MSC/VLR, thereby solving the problem that the user equipment cannot receive or send a short message when the user equipment is in an abnormal state due to reasons such as a failure of the MSC/VLR, thereby achieving receiving or sending of a short message, increasing a self-recovery capability of a network, saving network resources, and improving the user experience.

A person skilled in the art should appreciate that, in combination with the examples described in the embodiments herein, units and algorithm steps can be implemented by electronic hardware, computer software, or a combination thereof. To clearly describe the interchangeability between the hardware and the software, the foregoing has generally described compositions and steps of every embodiment according to functions. Whether the functions are executed by hardware or software depends on the particular applications and design constraint conditions of the technical solutions. Persons skilled in the art can use different methods to implement the described functions for every particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the embodiments provided in the present application, it should be understood that the disclosed system, apparatus and method may be implemented in other modes. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network elements. A part or all of the units herein may be selected according to the actual needs to achieve the objectives of the solutions of the embodiments of the present invention.

In addition, functional units in the embodiments of the present invention may be integrated into a processing unit, or each of the units may exist alone physically, or two or more units may be integrated into a unit. The integrated unit may be implemented in a form of hardware, or may be implemented in a form of a software functional unit.

When is implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in a form of software product. The computer software product is stored in a storage medium and includes several instructions for instructing a computer device (which may be a personal computer, a server, or a network device, and the like) to execute all or a part of steps of the method described in the embodiments of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing descriptions are merely some embodiments of the present invention, but not intended to limit the protection scope of the present invention. Any modification or replacement made by persons skilled in the art without departing from the technical scope disclosed by the present invention shall fall within the protection scope of the present invention. Therefore, the protection scope of the present invention shall be subject to the appended claims.

What is claimed is:

1. A method for receiving or sending a short message, the method comprising:
   receiving, by a mobile management device, a first message sent by a mobile switch center (MSC)/visitor location register (VLR);
   determining that a user equipment is in an abnormal state according to the first message; and sending a second message to the user equipment, wherein the second message is used to instruct the user equipment to initiate attachment to the MSC/VLR;

wherein the first message is a first paging message and wherein determining that the user equipment is in the abnormal state comprises determining that the user equipment is in the abnormal state based upon the first paging message not comprising a location area identity (LAI).

2. The method according to claim 1, further comprising determining that the user equipment is in an idle state, wherein the sending the second message to the user equipment comprises sending a second paging message to the user equipment.

3. The method according to claim 2, wherein a paging type or a paging cause value of the second paging message is used to instruct the user equipment to initiate the attachment to the MSC/VLR.

4. The method according to claim 2, wherein the second paging message comprises a combination of a user equipment identity and a core network domain identity, the combination of the user equipment identity and the core network domain identity being used to instruct the user equipment to initiate the attachment to the MSC/VLR.

5. The method according to claim 2, wherein sending the second paging message to the user equipment comprises:
sending, by the mobile management device, the second paging message to an evolved NodeB (eNB); and
sending, by the eNB, the second paging message to the user equipment.

6. The method according to claim 1, wherein, before the sending the second message to the user equipment, the method further comprises determining that the user equipment is in a connected state.

7. The method according to claim 6, wherein the second message is a detach request message and wherein a detach type of the detach request message is used to instruct the user equipment to initiate the attachment to the MSC/VLR.

8. The method according to claim 1, wherein the second message is a detach request message and a detach type of the detach request message is international mobile subscriber identification (IMSI) detach.

9. The method according to claim 1, wherein the method further comprises:
transmitting, by the MSC/VLR, the first message to the mobile management device.

10. The method according to claim 1, wherein the method further comprises:
transmitting, by the user equipment, a tracking area update request message to the mobile management device.

11. A system for receiving a short message, the system comprising:
a mobile switch center (MSC)/visitor location register (VLR), configured to transmit a paging message; and
a mobile management device, configured to receive the paging message from the MSC/VLR, determine a user equipment is in an abnormal state based upon the paging message not comprising a location area identity (LAI), and transmit a detach request message, wherein a detach type of the detach request message is international mobile subscriber identification (IMSI) detach.

12. The system according to claim 11, further comprising:
the user equipment, configured to receive the detach request message from the mobility management device, and transmit a tracking area update request message to the mobile management device according to the detach type of the detach request message.

13. The system according to claim 11, further comprising:
an evolved NodeB (eNB), configured to receive the detach request message from the mobility management device, and transmit the detach request message to the user equipment.

* * * * *